United States Patent [19]

Korte-Jungermann

[11] 4,208,133

[45] Jun. 17, 1980

[54] INJECTION CARTRIDGE

[75] Inventor: Hans W. Korte-Jungermann, Willich, Fed. Rep. of Germany

[73] Assignee: Korte-Jungermann Gesellschaft fur Fassadenbau und Befesstigungstechnik mit beschrankter Haftung, Willich, Fed. Rep. of Germany

[21] Appl. No.: 1,829

[22] Filed: Jan. 8, 1979

[30] Foreign Application Priority Data

Jan. 7, 1978 [DE] Fed. Rep. of Germany ....... 2800587
Feb. 25, 1978 [DE] Fed. Rep. of Germany ....... 2808230

[51] Int. Cl.² ............................................. B01F 15/02
[52] U.S. Cl. ................................... 366/130; 366/256; 222/82; 222/137
[58] Field of Search ............... 366/130, 189, 190, 255, 366/256; 206/219, 221; 222/80, 82, 83, 81, 137

[56] References Cited

U.S. PATENT DOCUMENTS

| 2,095,543 | 10/1937 | Doll | 366/130 |
| 3,144,966 | 8/1964 | Cook | 222/137 |
| 3,494,359 | 2/1970 | Zackheim | 222/137 |
| 3,735,900 | 5/1973 | Gores | 366/129 |
| 3,756,390 | 9/1973 | Abbey | 206/219 |

*Primary Examiner*—Robert W. Jenkins
*Attorney, Agent, or Firm*—Shlesinger, Arkwright, Garvey & Dinsmore

[57] ABSTRACT

An injection cartridge contains a number of components in separate chambers. To use the cartridge, the chambers are brought into communication and the components mixed to form a compound such as an adhesive which can then be injected into a hole.

The cartridge has a rigid housing which incorporates a movable mixing rod for mixing the components together, a displaceable injection opening and a piston which can be moved along the housing to extrude the mixed compound out through the injection opening.

16 Claims, 2 Drawing Figures

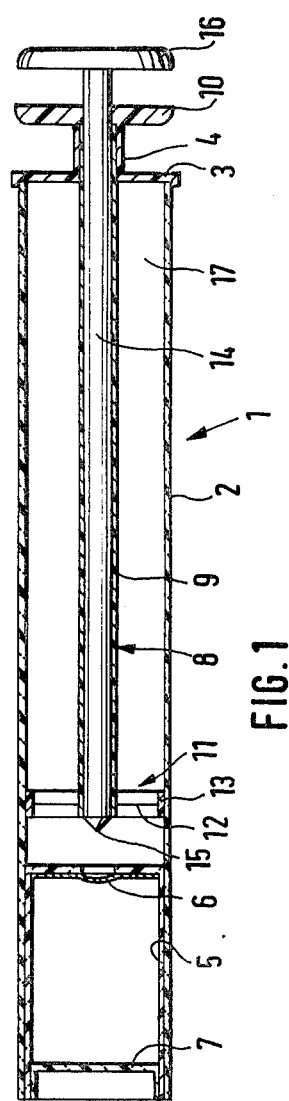
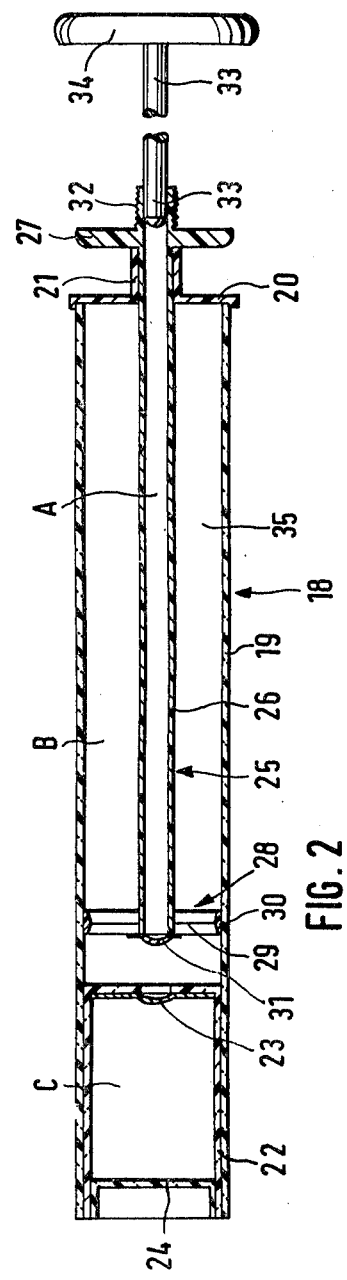
FIG. 1
FIG. 2

INJECTION CARTRIDGE

The invention relates to an injection-cartridge, with at least two separate chambers which can be brought into communcation with each other, each of said chambers holding a component which can be mixed with the other component in the cartridge, prior to use. The components may be for example resin, accelerator and hardening agent or cement and binder. Injection cartridges of this kind are used above all in the building industry for the anchoring of plugs, tie bolts or the like in masonry.

Some known injection cartridges have, according to the German Offenlegungsschrift No. 26 08 690, the form of a pouch, which is subdivided into chambers for each of the components by means of externally removable separating clamps. When the components are to be mixed together shortly before use, the separating clamps are removed and the components are mixed by kneading of the pouch, so that the desired compound, in most cases an adhesive, is obtained. This can then be injected into the desired location by compressing the pouch.

These known cartridges are distinguished by a simple construction and simplicity of operation.

It has been found however, that their storage life is limited, especially where synthetic adhesives are used. The foils used to form the pouch walls are resistant to chemical attack by the synthetic material itself, but they are not completely gas-tight, so that volatile components progressively diffuse through the foils. The result of this is that the contents slowly harden and eventually become unusable.

Another drawback is due to the fact that with these pouches it is difficult to apply the optimum quantity in each case in a uniform manner, since the amount injected can only be estimated.

According to the invention there is provided an injection cartridge for containing, in separate chambers, at least two components which are to be mixed together to form an injectable compound, the cartridge comprising a substantially rigid housing divided internally into at least two chambers which can be brought into communication with each other, a movable mixing rod within the housing for mixing components within the housing, a displaceable injection opening and a piston slidable along the housing to discharge a compound from the opening.

By the selection of a substantially rigid housing it becomes possible to employ materials which are completely gas-tight, so that diffusion of the volatile constituents of the components can be prevented. The serviceability of such a cartridge is therefore ensured even after prolonged storage.

The housing may consist of a polyamide or polyethylene material. These are relatively cheap materials, which are nevertheless gas-tight in the rigid form. Moreover, this material can be produced in a transparent form, so that the amount injected in each case can be precisely determined. This can be made particularly easy by providing on the wall of the housing a scale which accurately indicates the volume injected.

The housing may be a cylinder, because this shape is particularly easy to manufacture and the amount injected in each case is likewise easy to indicate.

The individual chambers may be separated by means of an easily ruptured foil, which foil expediently consists of aluminum. These types of foils reliably separate the chambers from each other, whilst on the other hand, they are also easily ruptured.

To effect this rupturing of the foils, the cartridge may be provided with a slidable nail. By pushing this nail home, the foil or foils are pierced, so that the components can be mixed together with the aid of the mixing rod.

According to a further feature of the invention, the mixing rod may have a flow channel, the outward projecting end of which constitutes the injection opening. After mixing of the components, this mixing rod can simultaneously serve as an injection tube, and it can be drawn out to a greater or lesser extent depending on the prevailing requirements. For ease of handling it is advantageous to provide the injection opening and the nail with collars on their external ends.

In another embodiment of the invention, the flow channel may be sealed on both ends for the purpose of storing a component, the inside end being covered by a removable closure. In this manner, a further function is assigned to the flow channel, to wit, its use as a chamber for an additional component. The externally located end of the channel should then be sealed with a covering cap, which can be unscrewed when the mixed compound is to be expelled from the injection opening.

At least two chambers may be arranged one behind the other as viewed in the direction of movement of the piston. This may be made possible for example by slidably seating a container for at least one of the components, forming the displacement piston, in that end of the housing which is located opposite the injection opening. The displacement piston thus may also serve to form a chamber for a second component, which results in a particularly simple construction of the cartridge.

An extruder piston may be slid into the external end of the container, by means of which the component located in the container may be pushed inwards into the other chamber and mixed with the component contained therein. For this purpose, the inner end of the container should be provided with at least one aperture sealed off with a closure.

In the case where the displacement piston of the cartridge is a container holding a further component and the flow channel is also constructed as a chamber for another component, the aperture in the container may be located in the extension of the longitudinal axis of the mixing rod so that a nail can be pushed in, which has a length such that in the fully inserted state it pierces the closures at the inner end of the flow channel and in the aperture of the container. In this manner, and three separated chambers are brought into communication with each other, so that the components can be mixed and thereafter expelled through the injection opening.

The mixing rod may be provided with fin-shaped spokes, which extend to the inner wall of the housing. During the to-and-fro movement of the mixing rod these spokes effect an intensive mixing of the various components. Here, it is advantageous to have the spokes interconnected at their ends, because this gives them additional rigidity and enables them to form a guide for the mixing rod.

The invention will now be further described, by way of example, with reference to the accompanying drawings, in which:

FIG. 1 shows an injection cartridge with two chambers; and

FIG. 2 shows an injection cartridge with three chambers.

FIG. 1 shows in axial section a cartridge 1, which has a cylinder-shaped housing 2 of transparent polyamide or polyethylene. In the view shown, this housing 2 is closed at the right-hand end by a housing lid 3, which has a small nipple 4.

A likewise cylinder-shaped container 5 is inserted into the opposite end of the housing 2 and contacts the inner wall of the latter. The inner front face of the container 5 has in the centre a circular aperture which is covered with an aluminum foil 6, whilst the outer front face of container 5 has a slidable extruder piston 7 set thereinto. The container 5 is thus separated from the internally adjoining space, so that in both spaces components can be stored, which are to be mixed only just before their application.

A mixing rod 8 is fitted into the nipple 4 of housing 2. This mixing rod has a guide tube 9, on the end of which, projecting from the nipple 4, a collar 10 is formed. On the opposite inner end of this guide tube 9 a mixing fin 11 is mounted, consisting of four spokes 12 and a guide ring 13 externally interconnecting the spokes 12 and contacting the inner face of the housing. Free passages exist between the spokes 12 and the guide ring 13, so that the mixing rod 8 can be moved to and fro within the housing 2.

Into the guide tube 9 of mixing rod 8 a nail 14 is inserted, its point 15 being directed towards the aluminium foil 6 of container 5. The nail 14 also has a collar 16 on its outer end. This nail 14 serves both for rupturing the aluminium foil 6 and for sealing the guide tube 9.

When in use, this injection cartridge 1 is operated in the following manner. Firstly, by pushing the nail 14 into the housing 2 the aluminium foil 6 of container 5 is perforated, so that the two chambers communicate with each other. Following this, the extruder piston 7 is pushed wholly into the container 5, until it comes to bear against the opposite wall carrying the aperture. In this manner, the component held in container 5 passes into the mixing chamber 17.

After this, the mixing rod 8 together with the nail 14 is pushed to and fro several times, whereby the two components, under the effect of the mixing fin 11, are intensively mixed with each other. After this mixing operation the nail 14 is withdrawn, so that the guide tube 9 of mixing rod 8 is open to the outside, thus forming an injection tube for the mixed compound. The guide tube 9 can now be pulled out to a greater or lesser extent as required and the collar 10 cut off, so that the compound can be injected into either deep or narrow recesses.

The injection itself is effected by continued inward pushing of the extruder piston 7 with the container 5, which together form the displacement piston for expulsion of the compound. During this operation, on a scale arranged on the outer face of the housing, the quantity of material injected can be observed. In this manner the quantities of adhesive used can be adapted to the prevailing conditions. In addition, it also becomes possible to have a control to the effect that the same quantity of material is always injected into identical recesses, which leads to economic usage.

FIG. 2 likewise shows in axial section an injection cartridge 18, modified relative to the cartridge 1 illustrated in FIG. 1. The cartridge 18 has a cylinder-shaped housing 19 made of translucent polyethylene. In the view of the drawing, the housing 19 is closed at the right-hand end by a housing lid 20, which has a small nipple 21.

As in the cartridge 1 according to FIG. 1, a cylinder-shaped container 22 is inserted into the opposite side of housing 19 and contacts the inner wall of the housing. The inner front face of container 22 has a circular aperture in the centre, which is covered with an aluminium foil 23, whilst into the outer front face of container 22 a slidable extruder piston 24 is fitted. The container 22 is thus separated from the internally adjoining space, so that in these two spaces components can be stored which are to be mixed together only just prior to their application.

In the nipple 21 of housing 19 a mixing rod 25 is seated. This mixing rod 25 is constructed as a guide tube 26, having a collar 27 formed on its end projecting out of nipple 21. On the opposite inner end of this guide tube 26 a mixing fin 28 is mounted, which consists of four spokes 29 and a guide ring 30 which externally interconnects the spokes 29 and bears against the inner face of the housing 19. Free passages exist between the spokes 29 and the guide ring 30, so that the mixing rod 25 can be moved to and fro within the housing 19.

In the region of the mixing fin 28, the open end of the guide tube 26 is tightly sealed by an aluminium foil 31, so that the hollow space formed by the guide tube 26 can also serve for storing a component separated from the other components. The three different components are here designated by the letters A, B and C, respectively.

The outer end of the mixing rod 25 has a threaded nipple 32, which can be closed by a screw cap. In this illustration, the screw cap has been removed and one end of a nail 33 has been pushed into the orifice. The other end of the nail 33 has a collar 34. The major part of the length of nail 33 has been omitted in FIG. 2.

When in use, this cartridge 18 is operated in the following manner. Firstly, the cover cap (not shown) is unscrewed from nipple 32 and the nail 33 is pushed into the guide tube 26. In consequence, the component A is displaced in the direction of the inner aperture of guide tube 26 and in the course of this movement so strongly compressed, that the aluminium foil 31 at this aperture is ruptured. By further displacement of the nail 33 the component A enters the space occupied by component B.

The length of the nail 33 is here so dimensioned, that in the fully inserted state its point ruptures the aluminium foil 23 in the aperture of container 22, so that all three chambers communicate with each other. Following this, the extruder piston 24 is pushed home to its fullest extent into the container 22, until it comes to bear against the opposite wall with the aperture. In this manner, the component C held in container 22 passes into the mixing chamber 25.

After this, the mixing rod 25 together with the nail 33 is pushed to and fro several times, so that the three components A, B and C are mixed by the mixing fin 28. After this mixing the nail 33 is withdrawn, so that the guide tube 26 of the mixing rod 25 is open to the outside, thus forming an injection tube for the mixed compound. The guide tube 26 can then be pulled out to a greater or lesser extent as required and the collar 27 cut off, so that the mixed compound can be injected even into deep and narrow recesses.

The injection itself is effected by continued inward pushing of the extruder piston 24 with the container 22, in the same manner as with the cartridge 1 according to FIG. 1.

It is expedient to push the nail used for rupturing the foil into the flow channel, especially when it acts there with sealing effect, because in this case the nail then serves at the same time as closure of the injection opening during storage and mixing. For this purpose, the nail can also be screwed into the flow channel, so that it cannot be accidentally displaced.

What we claim is:

1. An injection cartridge having at least two chambers for holding mixable components and comprising a rigid housing having a moveable injection opening at one end thereof and a moveable mixing rod, a container comprising one of said chambers forming a displacement piston slideable in said housing and positioned at the other end thereof, said container having a sealed opening at the end thereof toward the interior of said housing and a discharge piston forming the other end of said container and adapted to discharge the contents of said container into said housing when the seal of said opening is removed, whereby the contents of said container may be discharged through said opening into said housing by said discharge piston and mixed with other components by said mixing rod and the mixed components may be expelled through said injection opening by means of said displacement piston.

2. A cartridge according to claim 1, characterised in that the housing consists of polyethylene.

3. A cartridge according to claim 1 characterised in that the housing is cylindrical.

4. A cartridge according to claim 1 characterized in that said chambers are separated by means of an easily destructible foil covering said opening in said container.

5. A cartridge according to claim 4, characterised in that the foil consists of aluminium.

6. A cartridge according to claim 4, including a displaceable nail for rupturing the foil.

7. A cartridge according to claim 6, characterised in that the mixing rod has a flow channel the outward projecting end of which forms said injection opening.

8. A cartridge according to claim 7, characterised in that the nail is slideable in the flow channel.

9. A cartridge according to claim 8, characterised in that the nail is pushed into the flow channel with sealing effect.

10. A cartridge according to claim 8, characterised in that the injection opening and the nail have collars on their external ends.

11. A cartridge according to claim 10, characterised in that the flow channel is closed on both ends for storing an additional component.

12. A cartridge according to claim 11, characterised in that the externally located end of the flow channel is closed by a cover cap.

13. A cartridge according to claim 11, characterised in that the opening in the container is located on the extension of the longitudinal axis of the mixing rod and that the length of the nail is such that in the fully inserted state, the nail pierces the closure sealing the opening and the closure at the inner end of the flow channel.

14. A cartridge according to claim 1 characterised in that said at least two chambers are arranged one behind the other as viewed in the direction of movement of the piston.

15. A cartridge according to claim 1, characterised in that the mixing rod has fin-shaped spokes which extend to the inner wall of the housing.

16. A cartridge according to claim 15, characterised in that the spokes are interconnected at their ends.

* * * * *